US009326269B2

(12) United States Patent
Kim et al.

(10) Patent No.: US 9,326,269 B2
(45) Date of Patent: Apr. 26, 2016

(54) APPARATUS AND METHOD FOR SYNCHRONIZATION BETWEEN SCANNING INTERVAL AND MULTICAST INTERVAL IN BROADBAND WIRELESS ACCESS SYSTEM

(75) Inventors: Gyou-Hwan Kim, Gyeonggi-do (KR); Han-Seok Kim, Seoul (KR); Mi-Ae Wi, Gyeonggi-do (KR); Jun-Hwan Oh, Gyeonggi-do (KR); Sung-Kwan Kim, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 421 days.

(21) Appl. No.: 13/301,223

(22) Filed: Nov. 21, 2011

(65) Prior Publication Data

US 2012/0134312 A1 May 31, 2012

(30) Foreign Application Priority Data

Nov. 25, 2010 (KR) .................. 10-2010-0117859

(51) Int. Cl.
*H04W 72/00* (2009.01)
*H04W 4/06* (2009.01)
*H04W 56/00* (2009.01)
*H04W 76/00* (2009.01)

(52) U.S. Cl.
CPC .............. *H04W 72/005* (2013.01); *H04W 4/06* (2013.01); *H04W 56/0015* (2013.01); *H04W 76/002* (2013.01)

(58) Field of Classification Search
CPC combination set(s) only.
See application file for complete search history.

(56) References Cited

U.S. PATENT DOCUMENTS

| 2006/0009247 | A1* | 1/2006 | Kelley et al. ............... 455/515 |
| 2007/0060048 | A1* | 3/2007 | Kang et al. ............... 455/13.1 |
| 2007/0078974 | A1* | 4/2007 | Krishnan ................... 709/224 |
| 2007/0171865 | A1* | 7/2007 | Kato ......................... 370/329 |
| 2009/0005099 | A1* | 1/2009 | Jung et al. ................. 455/517 |
| 2009/0129325 | A1* | 5/2009 | Prakash et al. ............. 370/329 |
| 2010/0061289 | A1* | 3/2010 | Mun et al. .................. 370/312 |
| 2010/0265946 | A1* | 10/2010 | Huang et al. ............... 370/390 |

* cited by examiner

Primary Examiner — Ian N Moore
Assistant Examiner — Eric H Wang
(74) Attorney, Agent, or Firm — The Farrell Law Firm, P.C.

(57) ABSTRACT

Scanning cycle synchronization of a multicast service in a broadband wireless access system is provided. Multicast group information of a multicast group to which a Mobile Station (MS) belongs is received at the MS from an application server. A scanning cycle pattern and a scan offset of a multicast service corresponding to the multicast group are determined. A scanning cycle of the multicast is set according to the scanning cycle pattern and the scan offset. Scanning and reception of multicast data are performed according to the scanning cycle.

20 Claims, 8 Drawing Sheets

APPARATUS AND METHOD FOR SYNCHRONIZATION BETWEEN SCANNING INTERVAL AND MULTICAST INTERVAL IN BROADBAND WIRELESS ACCESS SYSTEM

PRIORITY

The present application claims priority under 35 U.S.C. §119(a) to a Korean patent application, which was filed in the Korean Intellectual Property Office on Nov. 25, 2010, and assigned Serial No. 10-2010-0117859, the content of which is incorporated herein by reference.

BACKGROUND OF THE INVENTION

1. Field of the Invention

The present invention relates generally to a broadband wireless access system, and more particularly, to an apparatus and a method for synchronization of a scanning cycle.

2. Description of the Related Art

Worldwide Interoperability for Microwave Access (WiMAX) provides high-speed Internet access for a mobile or stationary Mobile Station (MS). Accordingly, WiMAX systems should guarantee seamless data transmission and reception during MS mobility.

WiMAX supports handover so that the MS can receive the seamless data service while mobile. Specifically, seamless service is maintained when the MS migrates from existing Base Station (BS) coverage to coverage of another BS. Before handover, the MS obtains information on its neighboring BSs to determine which BS coverage to move to. A process for obtaining the neighboring BS information is referred to as scanning. Since the MS should receive the continuous data service during the scanning, the scanning and the data service need to be carried out without affecting each other.

Research has been conducted in order to provide both point-to-point telephone communication and various additional services. For example, group communication, specifically, a Push To Talk (PTT) service, using a broadband wireless access system, such as WiMAX, is one such additional service. PTT group communication services a plurality of MSs so that they receive the same data. When the same data is unicast to the MSs, radio resources are greatly wasted. Therefore, a multicasting method for transmitting the same data to the plurality of the MSs at the same time is suitable for use with PTT group communication services.

An MS using the unicast service can accomplish both scanning and data reception without having them affect each other by synchronizing a scanning interval and a unicast data reception interval. FIG. 1 is a diagram illustrating the scanning interval and the data reception interval. A scanning cycle 110 includes a scanning interval 114 and a scheduling interval 116, as shown in FIG. 1. The scheduling interval 116 is the unicast data reception interval. Specifically, the scanning cycle 110 starts from a frame indicated by a scan offset 112, and the scanning interval 114 is positioned at the front of the scanning cycle 110.

A multicast service transmits data to a plurality of MSs at the same time. When the scanning intervals of the MSs are different from each other, the scanning interval and a multicast data reception interval can overlap. As a result, when scanning is conducted in the multicast data reception interval or data is received in the scanning interval, multicast data reception quality or handover success rate can be degraded. Additionally, when the MS in an awake mode receives both of the unicast service and the multicast service, the reception intervals of the unicast data and the multicast data do not match. As a result, the unicast data and the multicast data affect each other and their reception quality can be degraded.

SUMMARY OF THE INVENTION

The present invention has been made to address at least the above problems and/or disadvantages and to provide at least the advantages described below. Accordingly, an aspect of the present invention provides an apparatus and a method for synchronizing a multicast data reception interval and a scanning interval in a broadband wireless access system.

Another aspect of the present invention provides an apparatus and a method for providing scanning interval information of a mobile station which receives a multicast service in a broadband wireless access system.

An additional aspect of the present invention provide an apparatus and a method for matching a multicast data reception interval and a unicast data reception interval in a broadband wireless access system.

According to one aspect of the present invention, an operating method of an MS in a wireless access system is provided. Multicast group information of a multicast group to which the MS belongs is received at the MS from an application server. A scanning cycle pattern and a scan offset of a multicast service corresponding to the multicast group are determined. A scanning cycle of the multicast service is set according to the scanning cycle pattern and the scan offset. Scanning and reception of multicast data are performed according to the scanning cycle.

According to another aspect of the present invention, an operating method of a BS in a wireless access system is provided. Multicast group information for a multicast group having a one or more MSs is received at the BS from an application server. A multicast path is established for the multicast group. A scanning cycle pattern and a scan offset to determine a scanning cycle of a multicast service corresponding to the multicast group are determined. A scanning cycle of the multicast service is set according to the scanning cycle pattern and the scan offset. Data is multicast according to the scanning cycle.

According to an additional aspect of the present invention, an operating method of an application server is provided for providing a multicast service through a wireless access system. A Connection IDentifier (CID) is allocated to a multicast group having one or more MSs. Multicast group information of the multicast group and a scanning cycle pattern of the multicast service are transmitted to a BS and the one or more MSs.

According to a further aspect of the present invention, an apparatus of an MS in a wireless access system is provided. The apparatus includes a modem for receiving multicast group information of a multicast group, to which the MS belongs, from an application server. The apparatus also includes a controller for determining a scanning cycle pattern and a scan offset of a multicast service corresponding to the multicast group, setting a scanning cycle of the multicast service according to the scanning cycle pattern and the scan offset, and performing scanning and reception of multicast data according to the scanning cycle.

According to another aspect of the present invention, an apparatus of a BS in a wireless access system is provided. The apparatus includes a communication part for receiving multicast group information for a multicast group, having one or more MSs, from an application server. The apparatus also includes a controller for establishing a multicast path for the multicast group, determining a scanning cycle pattern and a scan offset of a multicast service corresponding to the multicast group, and setting a scanning cycle of the multicast service according to the scanning cycle pattern and the scan offset. The apparatus further includes a modem for multicasting data according to the scanning cycle. Additionally, according to a further aspect of the present invention, an apparatus of an application server for providing a multicast service through a wireless access system is provided. The apparatus includes a controller for allocating a CID to a multicast group having one or more MSs. The apparatus also includes a communication part for transmitting multicast group information of the multicast group and a scanning cycle pattern of the multicast service to a BS and the one more MSs.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF EMBODIMENTS OF THE PRESENT INVENTION

Figure 1:
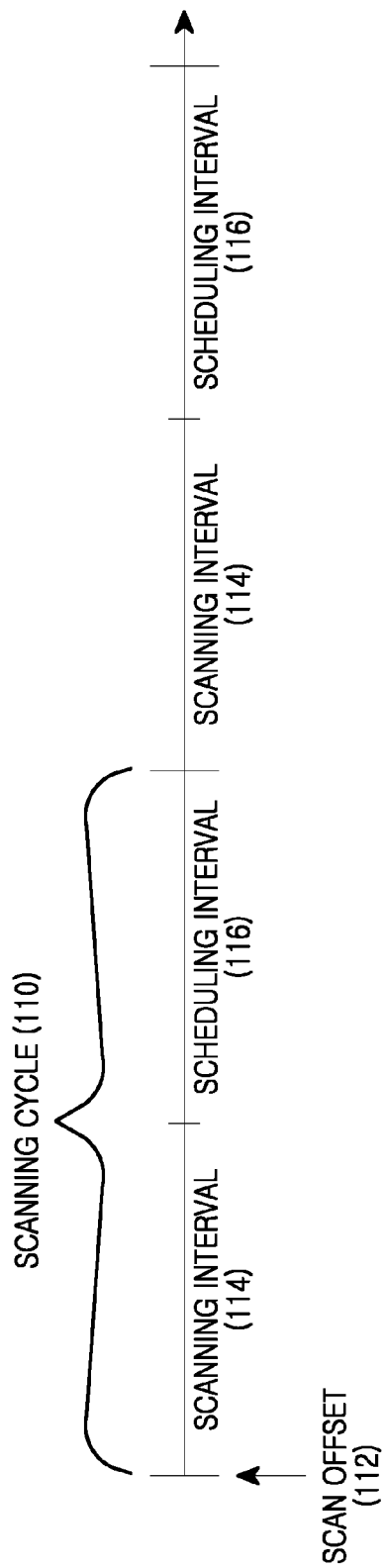
FIG. 1 is a diagram illustrating a scanning cycle of a broadband wireless access system.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

The terms and words used in the following description and claims are not limited to their dictionary meanings, but are merely used by the inventor to enable a clear and consistent understanding of the invention. Accordingly, it should be apparent to those skilled in the art that the following description of embodiments of the present invention is provided for illustration purposes only and not for the purpose of limiting the invention.

It is to be understood that the singular forms "a," "an," and "the" include plural referents unless the context clearly dictates otherwise. Thus, for example, reference to "a component surface" includes reference to one or more of such surfaces.

The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The embodiments of the present invention provide a technique for synchronizing a multicast data reception interval and a scanning interval in a broadband wireless access system. Hereinafter, Orthogonal Frequency Division Multiplexing (OFDM)/Orthogonal Frequency Division Multiple Access (OFDMA) wireless communication system is explained by way of example.

Information that is to be shared between a BS and an MS for a multicast service is described in detail below. One multicast group includes a plurality of MSs, which receive the same multicast service. Accordingly, it is necessary to manage the MSs of the one multicast group. An application server holds a group list for purposes of MS management. When the multicast group is defined for PTT group communication, the application server can be embodied as a PTT server. However, generally the BS does not identify the MSs in the multicast group. For the multicast service, the application server, which manages the group list, provides information on the multicast group to the BS and the MSs.

In a manner that is similar to general service flows, the multicast service is allocated a CID to identify the service flow in a Media Access Control (MAC) layer. The CID for the multicast service is fixedly allocated by the application server, and the application server manages mapping relationships of the multicast group and the CID. The application server establishes a multicast path of the BS and a multicast group A for the multicast service. In establishing the path and the group, the application server provides information of the multicast group A to a BS, which does not have information on the multicast group A. The multicast group A information includes an ID of the multicast group A, a multicast Internet Protocol (IP) address, and the CID.

The application server performs a multicasting announcement procedure to inform the MSs belonging to the multicast group A of their multicast group. The multicasting announcement procedure provides the multicast group information to the MSs of the multicast group using higher layer signaling. For example, the higher layer signaling can be conducted based on Session Initiation Protocol (SIP). The multicast group information can be transmitted using an SIP INFO message. Thus, the MSs of the multicast group A obtain the ID of their multicast group, the multicast IP address, and the CID.

To support the PTT group communication through the multicast service of the wireless access system, the scanning interval and the multicast/unicast scheduling interval must not overlap with each other. The scheduling interval refers to a data reception interval. Specifically, in the scheduling interval, the BS performs scheduling and MS receives data. Allocation of the scanning interval and the scheduling interval, i.e., information of a scanning cycle pattern, should be shared between the MS and the BS. The scanning cycle pattern includes a scanning interval length and a scheduling interval length, and includes at least one of a total length of the scanning cycle, the scanning interval length, and the scheduling interval length. The BS and the MS need to share the start of the scanning cycle, i.e., the scan offset information.

The MS can start scanning during the scanning interval at a point indicated by the scan offset, and the BS can schedule data transmission at times in the scheduling interval that exclude the scanning interval of the MS.

In embodiments of the present invention, the scanning cycle pattern information can be shared as set described in detail below.

For example, in one embodiment of the present invention, during system design, a system manufacturer records a predefined scanning cycle pattern to the BS and the MS. Thus, the BS and the MS already know the scanning cycle pattern; i.e., the scanning interval length and the scheduling interval length.

In another embodiment of the present invention, the BS transmits the scanning cycle pattern information to the MSs. Specifically, the BS transmits the scanning cycle pattern information to the MSs using a broadcasting message. For example, the BS sets a reserved bit of a predefined broadcasting message to a value indicating the scanning cycle pattern, or utilize a new broadcasting message defined to deliver the scanning cycle pattern. For example, the broadcasting message uses a Downlink Channel Descriptor (DCD) message. The BS transmits the prestored scanning cycle pattern information or the scanning cycle pattern information obtained from an operator management server.

In a further embodiment of the present invention, the application server transmits the scanning cycle pattern information to the BS and the MSs. Before providing the service using the multicasting of the wireless access network, the application server performs the multicast path establishment procedure with the BS and the multicasting announcement procedure with the MSs. Thus, the application server provides the scanning cycle pattern information to the BS using the multicast path establishing procedure, and provides the scanning cycle pattern information to the MSs using the multicasting announcement procedure.

In embodiments of the present invention, the scan offset information can be shared as described in detail below.

In one embodiment of the present invention, the scan offset information is shared in the same manner as the scanning cycle pattern information. Specifically, the scan offset information is predetermined in the system design phase, and is delivered by the broadcasting message of the BS, or transmitted from the application server to the BS and the MS.

In another embodiment of the present invention, the scan offset is determined based on the multicast group information according to a predefined rule. For example, the BS and the MS calculate the scan offset based on at least one of the CID, the IP address, and the ID of the corresponding multicast group. The predefined rule can be given by an equation. For example, the scan offset is defined as CID % (modulo) n. It is advantageous to define the rule such that a plurality of multicast groups has different scan offsets.

Accordingly, based on the above described embodiments of the present invention the BS and the MSs obtain the scanning cycle pattern information and the scan offset information, and receive the multicast service. When the MS does not receive the unicast service, e.g., when the MS operates in an idle mode, the MS manages the scanning interval and the scheduling interval by considering only the multicast service. In contrast, when the MS is in an awake mode for receiving the unicast service, the MS needs to additionally synchronize the scheduling interval of the unicast service to the scanning cycle pattern determined by the multicast service. In embodiments of the present invention, the MS in the awake mode determines the scan offset according to the multicast service, sets a recommended start frame field as the scan offset value of the multicast service, a scan duration field as the scanning interval length of the multicast service, and an interleaving interval field as the scheduling interval length value of the multicast service in a SCaN-REQuest (SCN-REQ) message. The MS transmits the SCN-REQ message to the BS. The recommended start frame is the field indicating a frame location for commencing the scanning of the corresponding MS. The scanning duration is the field indicating the scanning interval length for the unicast service. The interleaving interval is the field indicating the scheduling interval length of the unicast service. Thus, a unicast scheduler of the BS determines the scan offset, the scanning interval, and the scheduling interval for the MS's unicast service according to the recommended start frame field value, the scanning interval field value, and the interleaving interval field value. As a result, the scheduling interval of the unicast service of the MS matches the scheduling interval of the multicast service.

After the scanning cycle pattern information and the scan offset information are shared between the MS and the BS, the multicast service commences. The MS scans in the scanning interval from the frame indicated by the scan offset, and receives data in the scheduling interval. In so doing, the idle MS receives only the multicast data, and the awakened MS receives both of the multicast data and the unicast data. The BS stands by in the scanning interval from the frame indicated by the scan offset, schedules the multicast data transmission in the scheduling interval, and transmits the multicast data.

Figure 2:
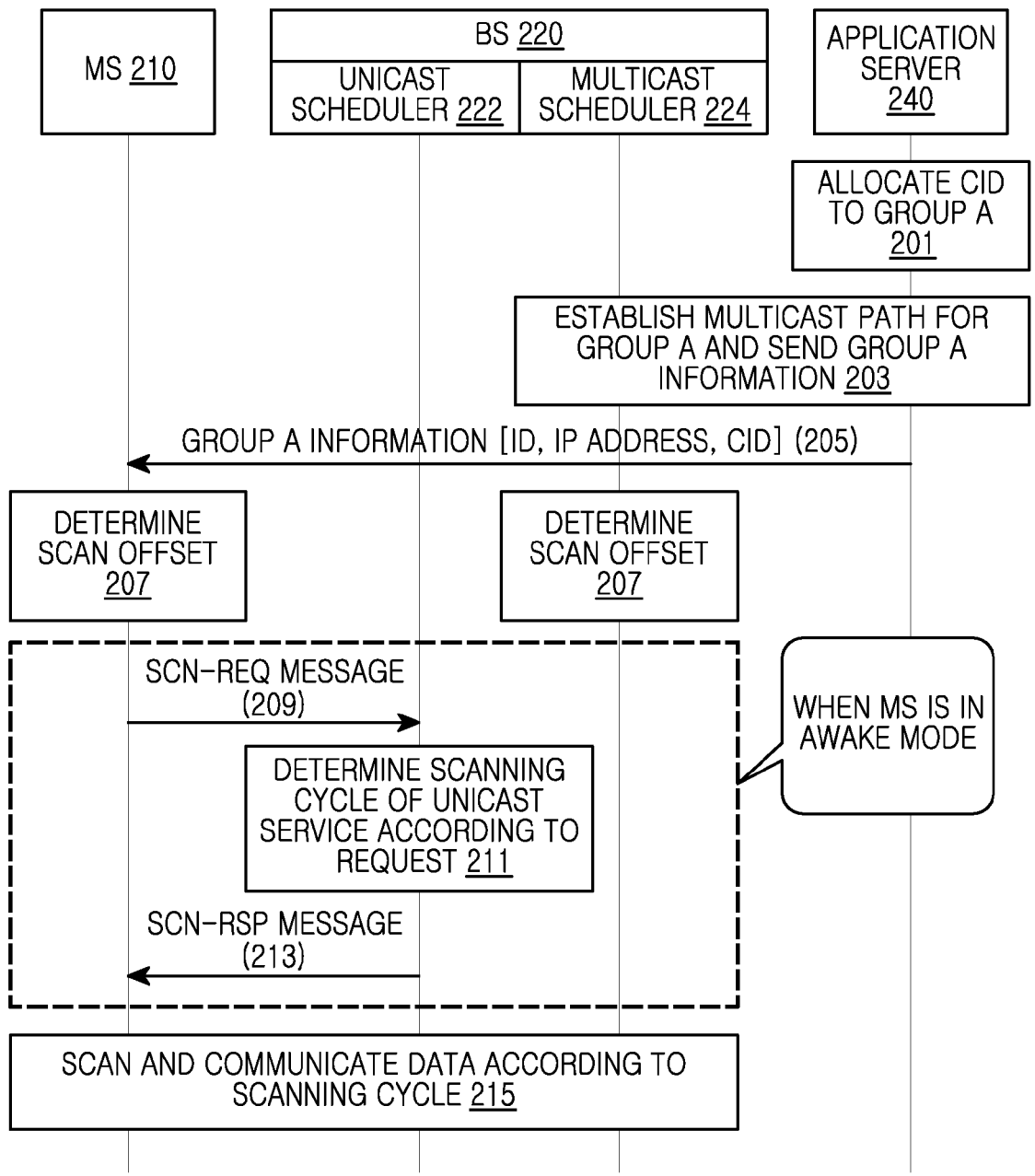
FIG. 2 is a diagram illustrating a scanning cycle synchronization method for a multicast service in a broadband wireless access system, according to an embodiment of the present invention.

FIG. 2 is a diagram illustrating a scanning cycle synchronization method for the multicast service in the broadband wireless access system, according to an embodiment of the present invention. In FIG. 2, the scanning cycle pattern information is already recorded to the BS and the MS.

Referring to FIG. 2, an application server 240 allocates a CID to a multicast group A, in step 201. The CID identifies the service flow for multicast group A in the MAC layer. The application server 240 fixedly allocates the CID to group A and manages the mapping relationship of group A and the CID.

In step 203, the application server 240 and a multicast scheduler 224 of a BS 220 establish a multicast path for multicast group A. In so doing, the application server 240 provides multicast group A information to the multicast scheduler 224 of the BS 220. Multicast group A information includes a group ID, a multicast IP address, and the CID.

In step 205, the application server 240 transmits multicast group A information to an MS 210. Specifically, the application server 240 and the MS 210 perform the multicasting announcement procedure. Multicast group A information is transmitted based on higher layer signaling, such as, for example, the SIP. Multicast group A information includes the group ID, the multicast IP address, and the CID.

In step 207, the MS 210 and the multicast scheduler 224 of the BS 220 determine the scan offset for the multicast service. The MS 210 and the multicast scheduler 224 of the BS 220 can determine the scan offset based on multicast group A information according to a predefined rule. For example, the MS 210 and the multicast scheduler 224 of the BS 220 calculate the scan offset based on at least one of the CID, the IP address, and the ID of multicast group A. The predefined rule can be provided by an equation. For example, the scan offset can be defined as CID % (modulo) n.

In step 209, the MS 210 transmits the SCN-REQ message to a unicast scheduler 222 of the BS 220. The SCN-REQ message is a control message for determining the scanning cycle for the unicast service. Specifically, the MS 210 requests that setup variables of the scanning cycle of the multicast service be applied to the scanning cycle of the unicast service in order to match the scanning cycle of the multicast service obtained in step 205 and the scanning cycle of the unicast service. For example, the SCN-REQ message includes at least one of the setup variables desired by the MS 210, which include, for example, a desired scanning cycle length, a desired scanning interval length, a desired scheduling interval length, a desired scan offset, and a desired scanning interval start point. The setup variables are the same as the setup values of the scanning cycle of the multicast service. More specifically, the SCN-REQ message can include, for example, a ScanDuration field indicating the desired scanning interval length, an InterleavingInterval field indicating the desired scheduling interval length, and a Recommended start frame field indicating the desired scanning interval start point.

In step 211, the unicast scheduler 222 of the BS 220 determines the scanning cycle as requested by the MS 210 in the SCN-REQ message. Specifically, the unicast scheduler 222 of the BS 220 sets the scanning cycle of the unicast service of the MS 210 as equal to the scanning cycle of the multicast service corresponding to multicast group A. In step 213, the unicast scheduler 222 transmits a SCN-ReSPonse (RSP) message notifying the MS 210 of the scanning cycle determination result of the unicast service.

The scanning cycle determination of the unicast service in steps 209 through 213 is carried out when the MS 210 receives the unicast service, specifically, when the MS 210 operates in the awake mode. Accordingly, when the MS 210 is in the idle mode, steps 209 through 213 are omitted from the methodology of FIG. 2.

In step 215, the MS 210, the unicast scheduler 222 and the multicast scheduler 224 perform scanning and data communication according to the scanning cycle. The scanning cycle pattern information is prestored to the MS 210 and the BS 220. Specifically, the MS 210 and the multicast scheduler 224 of the BS 220 define the scanning cycle according to the prestored scanning cycle pattern and the scan offset determined in step 207. The MS 210 attempts to receive signals from neighboring BSs in the scanning interval and measures channel quality of the neighboring BSs using the received signals. The unicast scheduler 222 and the multicast scheduler 224 of the BS 220 schedule the data communication with the MS 210 in the scheduling interval, and communicate data. The multicast scheduler 224 of the BS 220 receives the multicast data from the application server 240.

Figure 3:
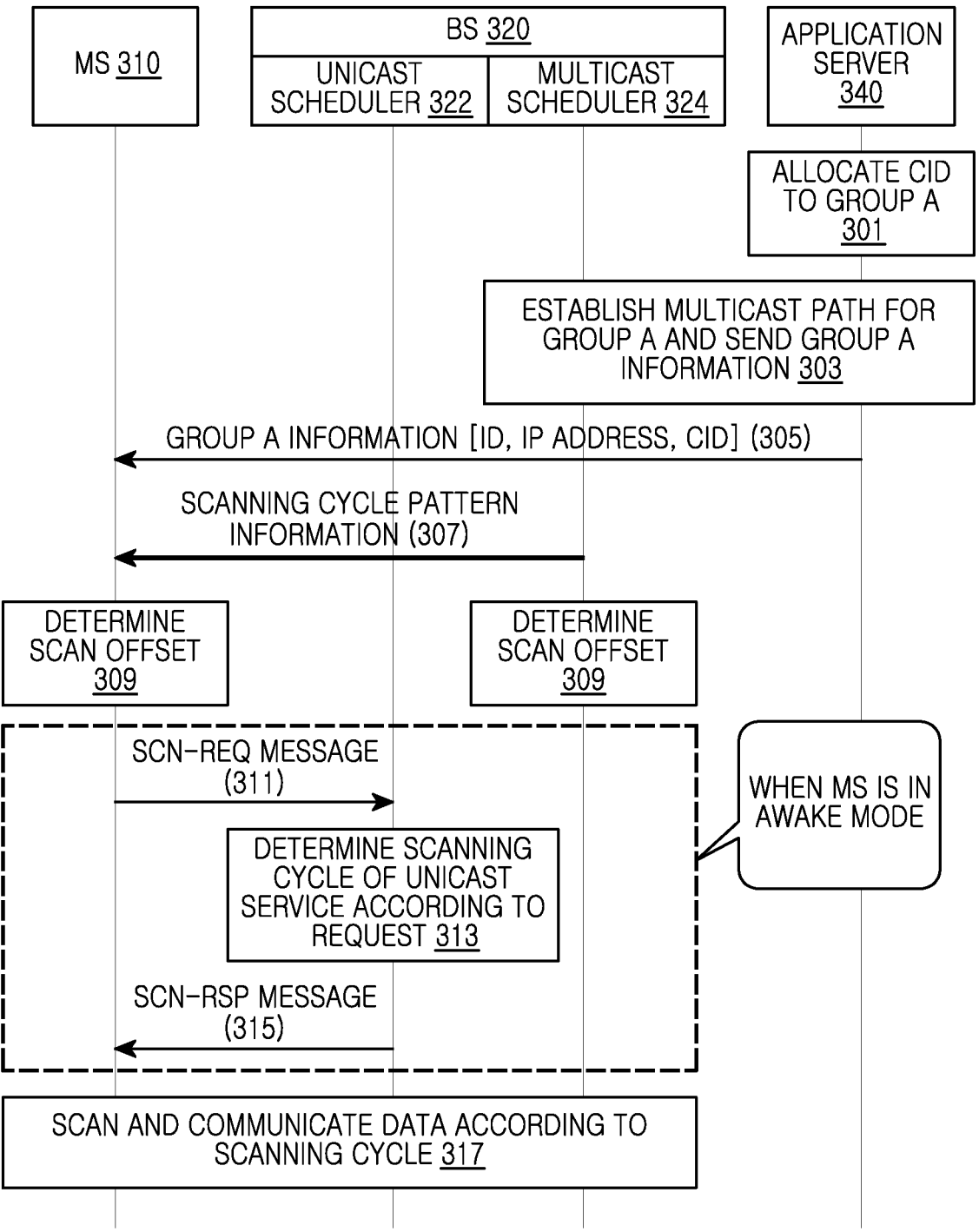
FIG. 3 is a diagram illustrating a scanning cycle synchronization method for a multicast service in the broadband wireless access system, according to another embodiment of the present invention.

FIG. 3 is a diagram illustrating a scanning cycle synchronization method for the multicast service in the broadband wireless access system, according to another embodiment of the present invention. In FIG. 3, the scanning cycle pattern information is broadcast by the BS.

Referring to FIG. 3, an application server 340 allocates a CID to a multicast group A, in step 301. The CID identifies the service flow for multicast group A in the MAC layer. The application server 340 allocates the fixed CID to multicast group A and manages the mapping relationship of multicast group A and the CID.

In step 303, the application server 340 and a multicast scheduler 324 of the BS 320 establish a multicast path for multicast group A. In so doing, the application server 340 provides multicast group A information to the multicast scheduler 324 of the BS 320. Multicast group A information includes a group ID, a multicast IP address, and the CID.

In step 305, the application server 340 transmits multicast group A information to an MS 310. Specifically, the application server 340 and the MS 310 perform the multicasting announcement procedure. Multicast group A information is transmitted based on higher layer signaling, specifically, for example, the SIP. Multicast group A information includes the group ID, the multicast IP address, and the CID.

In step 307, the multicast scheduler 324 of the BS 320 broadcasts the scanning cycle pattern information of the multicast service. The scanning cycle pattern information includes at least one of the total length of the scanning cycle, the scanning interval length, and the scheduling interval length. Specifically, the multicast scheduler 324 of the BS 320 transmits a broadcasting message including the scanning cycle pattern information. For example, the multicast scheduler 324 of the BS 320 can use a reserved bit of the predefined broadcasting message, or a new broadcasting message defined to carry the scanning cycle pattern. For example, the broadcasting message can be a DCD message. In FIG. 3, the scanning cycle pattern information is transmitted after the MS 310 receives multicast group A information. The scanning cycle pattern information can be transmitted based on a transmission period of the broadcasting message, regardless of the transmission of the group A information.

In step 309, the MS 310 and the multicast scheduler 324 of the BS 320 determine the scan offset for the multicast service. The MS 310 and the multicast scheduler 324 of the BS 320 can determine the scan offset based on multicast group A information according to a predefined rule. For example, the MS 310 and the multicast scheduler 324 of the BS 320 calculate the scan offset based on at least one of the CID, the IP address, and the ID of multicast group A. The predefined rule can be provided by an equation. For example, the scan offset can be defined as CID % (modulo) n.

In step 311, the MS 310 transmits the SCN-REQ message to a unicast scheduler 322 of the BS 320. The SCN-REQ message is the control message for determining the scanning cycle for the unicast service. Specifically, the MS 310 requests that the setup variables of the scanning cycle of the multicast service be applied to the scanning cycle of the unicast service in order to match the scanning cycle of the multicast service obtained in step 305 and the scanning cycle of the unicast service. For example, the SCN-REQ message includes at least one of the setup variables desired by the MS 310, which include, for example, the desired scanning cycle length, the desired scanning interval length, the desired scheduling interval length, the desired scan offset, and the desired scanning interval start point. The setup variables are the same as the setup values of the scanning cycle of the multicast service. More specifically, the SCN-REQ message can include, for example, the ScanDuration field indicating the desired scanning interval length, the InterleavingInterval field indicating the desired scheduling interval length, and the Recommended start frame field indicating the desired scanning interval start point.

In step 313, the unicast scheduler 322 of the BS 320 determines the scanning cycle as requested by the MS 310 in the SCN-REQ message. Specifically, the unicast scheduler 322 of the BS 320 sets the scanning cycle of the unicast service of the MS 310 as equal to the scanning cycle of the multicast service corresponding to multicast group A. In step 315, the unicast scheduler 322 can transmit a SCN-RSP message notifying the MS 310 of the scanning cycle determination result of the unicast service.

The scanning cycle determination of the unicast service in steps 311 through 315 is carried out when the MS 310 receives the unicast service, specifically, when the MS 310 operates in the awake mode. Accordingly, when the MS 310 is in the idle mode, steps 309 through 311 are omitted from the methodology of FIG. 3.

In step 317, the MS 310, the unicast scheduler 322 and the multicast scheduler 324 perform scanning and data communication according to the scanning cycle. The MS 310 and the multicast scheduler 324 of the BS 320 define the scanning cycle according to the scanning cycle pattern broadcast in step 307 and the scan offset determined in step 309. The MS 310 attempts to receive signals from neighboring BSs in the scanning interval and measures channel quality of the neighboring BSs using the received signals. The unicast scheduler 322 and the multicast scheduler 324 of the BS 320 schedule the data communication with the MS 310 in the scheduling interval, and communicate the data. The multicast scheduler 324 of the BS 320 receives the multicast data from the application server 340.

Figure 4:
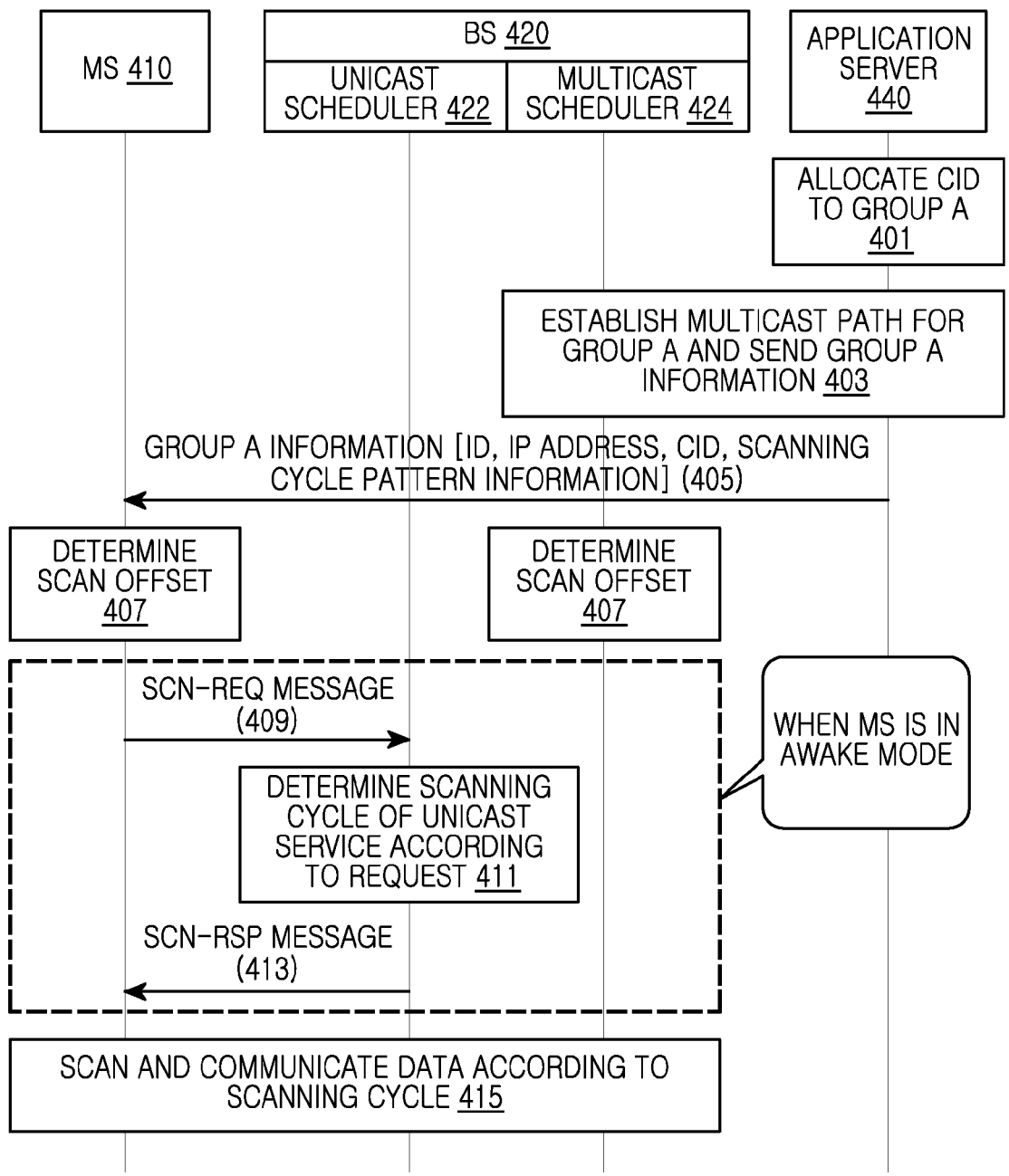
FIG. 4 is a diagram illustrating a scanning cycle synchronization method for the multicast service in the broadband wireless access system, according to yet another embodiment of the present invention.

FIG. 4 is a diagram illustrating a scanning cycle synchronization method for the multicast service in the broadband wireless access system, according to yet another embodiment of the present invention. In FIG. 4, the scanning cycle pattern information is transmitted by the application server.

Referring to FIG. 4, an application server 440 allocates a CID to a multicast group A, in step 401. The CID identifies the service flow for multicast group A in the MAC layer. The application server 440 allocates the fixed CID to the group A and manages the mapping relationship of group A and the CID.

In step 403, the application server 440 and a multicast scheduler 424 of the BS 420 establish a multicast path for multicast group A. In so doing, the application server 440 provides multicast group A information to the multicast scheduler 424 of the BS 420. Multicast group A information includes the group ID, the multicast IP address, and the CID. Multicast group A information also includes the scanning cycle pattern information. The scanning cycle pattern information includes at least one of the scanning cycle total length, the scanning interval length, and the scheduling interval length.

In step 405, the application server 440 transmits multicast group A information to an MS 410. Specifically, the application server 440 and the MS 410 perform the multicasting announcement procedure. Multicast group A information is transmitted based on higher layer signaling, such as, for example, the SIP. Multicast group A information includes the group ID, the multicast IP address, and the CID. Multicast group A information also includes the scanning cycle pattern information.

In step 407, the MS 410 and the multicast scheduler 424 of the BS 420 determine the scan offset for the multicast service. The MS 410 and the multicast scheduler 424 of the BS 420 can determine the scan offset based on multicast group A information according to a predefined rule. For example, the MS 410 and the multicast scheduler 424 of the BS 420 calculate the scan offset based on at least one of the CID, the IP address, and the ID of multicast group A. The predefined rule can be provided by an equation. For example, the scan offset can be defined based on CID % (modulo) n.

In step 409, the MS 410 transmits the SCN-REQ message to a unicast scheduler 422 of the BS 420. The SCN-REQ message is the control message for determining the scanning cycle for the unicast service. Specifically, the MS 410 requests that the setup variables of the scanning cycle of the multicast service be applied to the scanning cycle of the unicast service in order to match the scanning cycle of the multicast service obtained in step 405 and the scanning cycle of the unicast service. For example, the SCN-REQ message includes at least one of the setup variables desired by the MS 410, which include for example, the desired scanning cycle length, the desired scanning interval length, the desired scheduling interval length, the desired scan offset, and the desired scanning interval start point. The setup variables are the same as the setup values of the scanning cycle of the multicast service. More specifically, the SCN-REQ message can include, for example, the ScanDuration field indicating the desired scanning interval length, the InterleavingInterval field indicating the desired scheduling interval length, and the Recommended start frame field indicating the desired scanning interval start point.

In step 411, the unicast scheduler 422 of the BS 420 determines the scanning cycle as requested by the MS 410 in the SCN-REQ message. Specifically, the unicast scheduler 422 of the BS 420 sets the scanning cycle of the unicast service of the MS 410 as equal to the scanning cycle of the multicast service corresponding to multicast group A. In step 413, the unicast scheduler 422 can transmit the SCN-RSP message notifying the MS 410 of the scanning cycle determination result of the unicast service.

The scanning cycle determination of the unicast service in steps 409 thorough 413 is carried out when the MS 410 receives the unicast service, specifically, when the MS 410 operates in the awake mode. Accordingly, when the MS 410 is in the idle mode, steps 409 and 413 are omitted from the methodology of FIG. 2.

In step 415, the MS 410, the unicast scheduler 422 and the multicast scheduler 424 perform scanning and data communication according to the scanning cycle. Specifically, the MS 410 and the multicast scheduler 424 of the BS 420 define the scanning cycle according to the scanning cycle pattern obtained in steps 403 and 405 and the scan offset determined in step 407. The MS 410 attempts to receive signals from neighboring BSs in the scanning interval and measures channel quality of the neighboring BSs using the received signals. The unicast scheduler 422 and the multicast scheduler 424 of the BS 420 schedule the data communication with the MS 410 in the scheduling interval, and communicate data. The multicast scheduler 424 of the BS 420 receives the multicast data from the application server 440.

Figure 5:
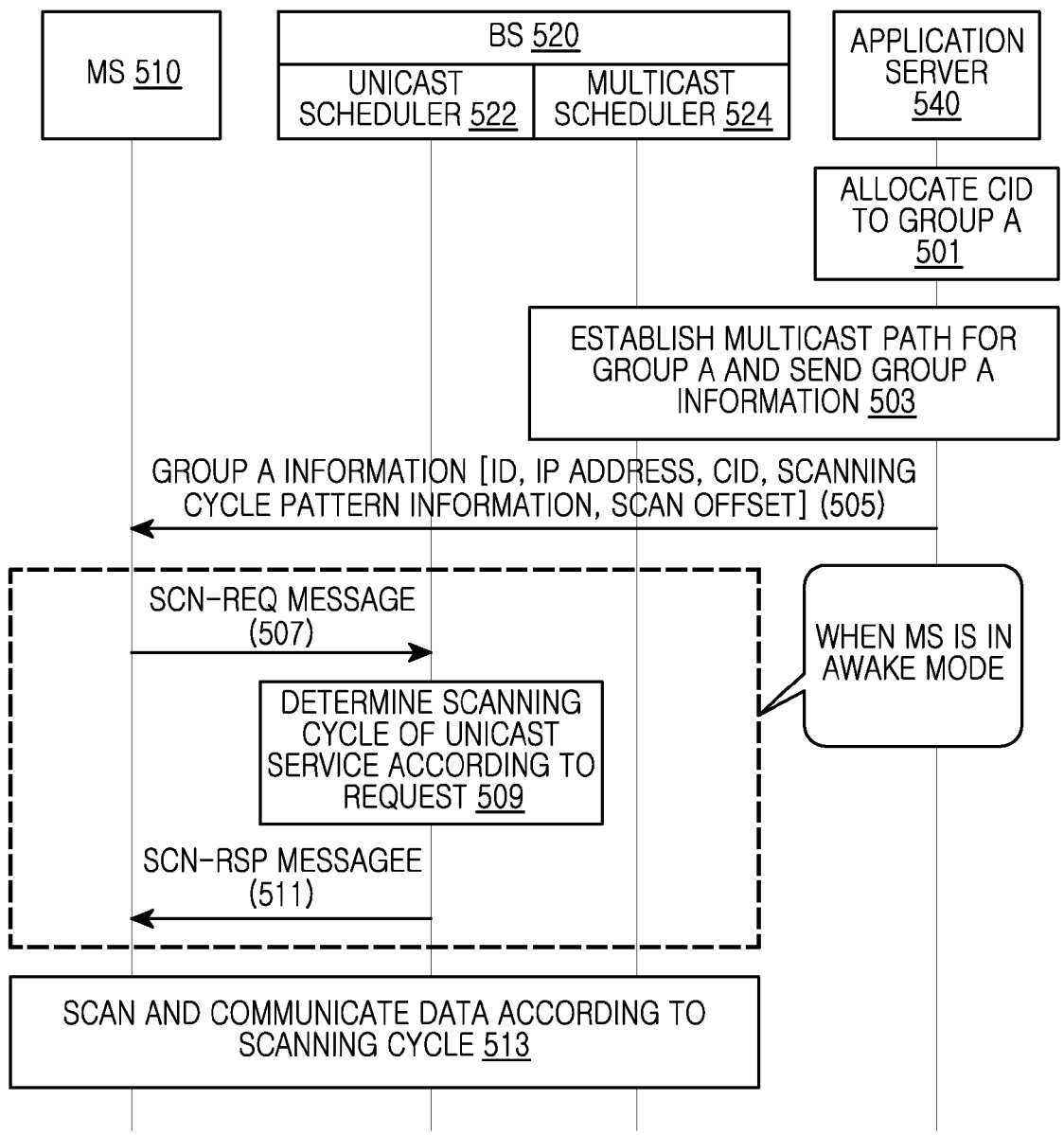
FIG. 5 is a diagram illustrating a scanning cycle synchronization method for the multicast service in the broadband wireless access system, according to still another embodiment of the present invention.

FIG. 5 is a diagram illustrating a scanning cycle synchronization method for the multicast service in the broadband wireless access system, according to still another embodiment of the present invention. In FIG. 5, the scanning cycle pattern information and the scan offset information are transmitted by the application server Referring to FIG. 5, an application server 540 allocates a CID to a multicast group A in step 501. The CID identifies the service flow for multicast group A in the MAC layer. The application server 540 allocates the fixed CID to group A and manages the mapping relationship of multicast group A and the CID.

In step 503, the application server 540 and a multicast scheduler 524 of the BS 520 establish a multicast path for multicast group A. In so doing, the application server 540 provides multicast group A information to the multicast scheduler 524 of the BS 520. Multicast group A information includes the group ID, the multicast IP address, and the CID. The multicast group A information also includes the scanning cycle pattern information and the scan offset information. The scanning cycle pattern information includes at least one of the scanning cycle total length, the scanning interval length, and the scheduling interval length.

In step 505, the application server 540 transmits multicast group A information to an MS 510. Specifically, the application server 540 and the MS 510 perform the multicasting announcement procedure. Multicast group A information is transmitted based on higher layer signaling, such as, for example, the SIP. Multicast group A information includes the group ID, the multicast IP address, and the CID. The multicast group A information also includes the scanning cycle pattern information and the scan offset information.

In step 507, the MS 510 transmits the SCN-REQ message to a unicast scheduler 522 of the BS 520. The SCN-REQ message is the control message for determining the scanning cycle for the unicast service. Specifically, the MS 510 requests that the setup variables of the scanning cycle of the multicast service be applied to the scanning cycle of the unicast service in order to match the scanning cycle of the multicast service obtained in step 505 and the scanning cycle of the unicast service. For example, the SCN-REQ message includes at least one of the setup variables desired by the MS 510, which include, for example, the desired scanning cycle length, the desired scanning interval length, the desired scheduling interval length, the desired scan offset, and the desired scanning interval start point. The setup variables are the same as the setup values of the scanning cycle of the multicast service. More specifically, the SCN-REQ message can include, for example, the ScanDuration field indicating the desired scanning interval length, the InterleavingInterval field indicating the desired scheduling interval length, and the Recommended start frame field indicating the desired scanning interval start point.

In step 509, the unicast scheduler 522 of the BS 520 determines the scanning cycle as requested by the MS 510 in the SCN-REQ message. Specifically, the unicast scheduler 522 of the BS 520 sets the scanning cycle of the unicast service of the MS 510 as equal to the scanning cycle of the multicast service corresponding to multicast group A. In step 511, the unicast scheduler 522 can transmit the SCN-RSP message notifying the MS 510 of the scanning cycle determination result of the unicast service.

The scanning cycle determination of the unicast service in steps 507 through 511 is carried out when the MS 510 receives the unicast service, specifically, when the MS 510 operates in the awake mode. Accordingly, when the MS 510 is in the idle mode, steps 507 through 511 can be omitted from the methodology of FIG. 5.

In step 513, the MS 510, the unicast scheduler 522 and the multicast scheduler 524 perform scanning and data communication according to the scanning cycle. The MS 510 and the multicast scheduler 524 of the BS 520 define the scanning cycle according to the scanning cycle pattern and the scan offset obtained in steps 503 and 505. The MS 510 attempts to receive signals from neighboring BSs in the scanning interval and measures channel quality of the neighboring BSs using the received signals. The unicast scheduler 522 and the multicast scheduler 524 of the BS 520 schedule the data communication with the MS 510 in the scheduling interval, and communicate data. The multicast scheduler 524 of the BS 520 receives the multicast data from the application server 540.

In FIG. 5, the application server 540 transmits the scan offset information. Yet, in other implementations, the scan offset information can be prestored similar to the scanning cycle pattern information of FIG. 2, or broadcast by the multicast scheduler 524 of the BS 520 similar to the scanning cycle pattern information of FIG. 3.

Figure 6:
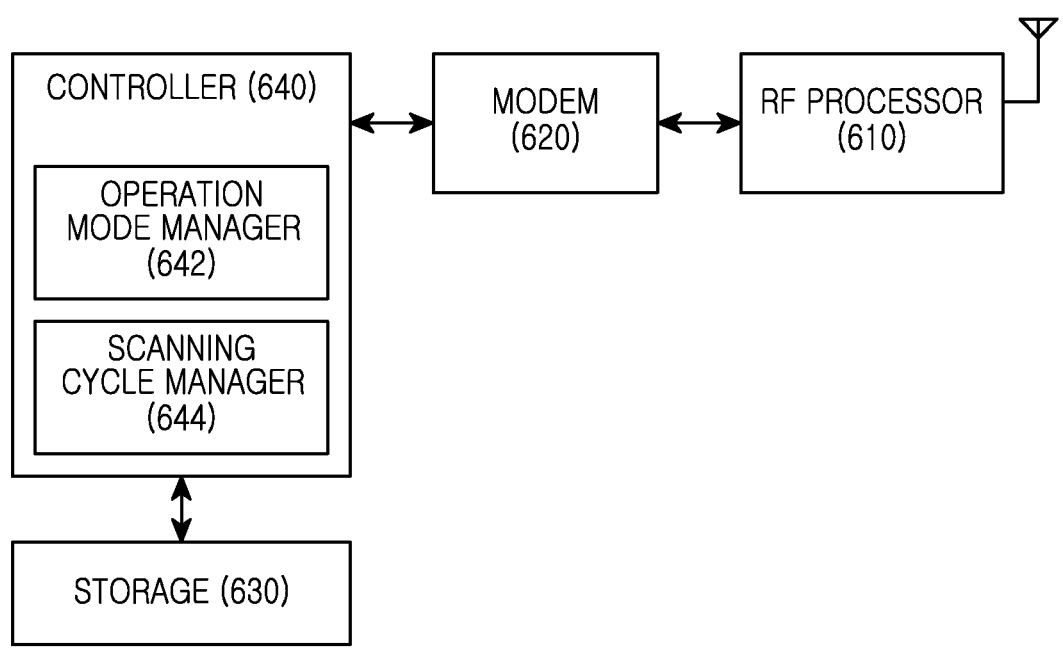
FIG. 6 is a diagram illustrating a mobile station in the broadband wireless access system, according to an embodiment of the present invention.

FIG. 6 is a block diagram illustrating the MS in the broadband wireless access system, according to an embodiment of the present invention.

In FIG. 6, the MS includes a Radio Frequency (RF) processor 610, a modem 620, a storage 630, and a controller 640.

The RF processor 610 converts a signal band and amplifies the signal to transmit and receive signals over a radio channel. Specifically, the RF processor 610 up-converts a baseband signal output from the modem 620 to an RF signal, transmits the RF signal via an antenna, and down-converts an RF signal received via the antenna to a baseband signal. For example, the RF processor 610 can include an amplifier, a mixer, an oscillator, a Digital to Analog Converter (DAC), an Analog to Digital Converter (ADC), and the like.

The modem 620 converts the baseband signal and a bit string according to the physical layer standard of the system. For example, according to the OFDM/OFDMA scheme, to transmit data, the modem 620 generates complex symbols by encoding and modulating the transmit bit string, maps the complex symbols to subcarriers, and constitutes OFDM symbols by applying Inverse Fast Fourier Transform (IFFT) and inserting a Cyclic Prefix (CP). When receiving data, the modem 620 splits the baseband signal output from the RF processor 610 to OFDM symbols, restores the signals mapped to the subcarriers using Fast Fourier Transform (FFT), and restores the receive bit string by demodulating and decoding the signals.

The storage 630 stores a basic program, an application program, and data, such as user contents, for the operations of the MS. The storage 630 provides the stored data according to a request of the controller 640. In particular, when the MS receives the multicast service, the storage 630 stores the corresponding multicast group information, such as, for example, the multicast CID, the multicast IP address, the group ID, and the scanning cycle information of the multicast service.

The controller 640 controls the functions of the MS. For example, the controller 640 generates and provides a transmit traffic packet and a message to the modem 620, and analyzes a receive traffic packet and a message output from the modem 620. An operation mode manager 642 of the controller 640 determines the operation mode of the MS and controls the functions of the MS according to the determined operation mode. The operation mode includes the awake mode and the idle mode. A scanning cycle manager 644 of the controller 640 manages the information of the scanning cycle of the unicast service and the scanning cycle of the multicast service, and operates the MS based on the scanning cycle.

In the multicast service, the controller 640 receives the multicast group information from the application server and stores the received information to the storage 630. The multicast group information includes the multicast IP address, the CID, and the group ID. The controller 640 controls reception of the multicast data using the multicast group information. In particular, to synchronize the scanning cycle of the multicast service, the controller 640 obtains the scanning cycle pattern information and the scan offset information as described in detail below.

In an embodiment of the present invention, the controller 640 can prestore the scanning cycle pattern information from the manufacturer. Alternatively, the controller 640 can obtain the scanning cycle pattern information through the message broadcast by the BS. For example, the broadcasting message can be the DCD message. Alternatively, when receiving the multicast group information from the application server, the controller 640 can obtain the scanning cycle pattern information together with the multicast group information.

In an embodiment of the present invention, the controller 640 can obtain the scan offset information in the same manner as the scanning cycle pattern information. Specifically, the controller 640 can prestore the scan offset information, obtain the scan offset information from the message broadcast by the BS, or receive the scan offset information together with the multicast group information from the application server. Alternatively, the controller 640 can determine the scan offset based on the multicast group information according to the predefined rule. For example, the controller 640 calculates the scan offset based on at least one of the CID, the IP address, and the ID. For example, the scan offset can be provided by CID % (modulo) n.

According to embodiments of the present invention, the controller 640 can obtain the scanning cycle pattern information and the scan offset information for the multicast service, and receive the multicast service. In the multicast service, when the MS also receives the unicast service, the controller 640 matches the scanning cycle of the unicast service to the scanning cycle of the multicast service. Specifically, the controller 640 generates the SCN-REQ message including at least one of the desired scanning cycle, the desired scanning interval length, the desired scheduling interval length, the desired scan offset, and the desired scanning interval start point, and transmits the SCN-REQ message to the BS through the modem 620 and the RF processor 610.

Figure 7:
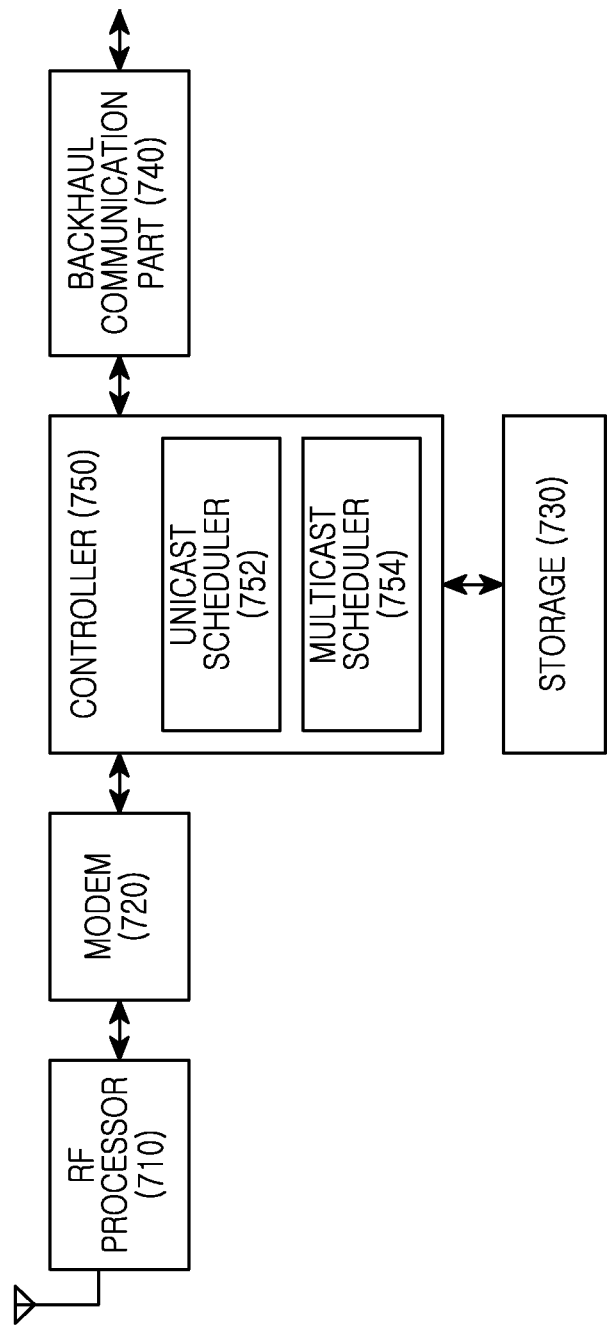
FIG. 7 is a diagram illustrating a base station in the broadband wireless access system, according to an embodiment of the present invention.

FIG. 7 is a block diagram illustrating the BS in the broadband wireless access system, according to an embodiment of the present invention.

In FIG. 7, the BS includes an RF processor 710, a modem 720, a storage 730, a backhaul communication part 740, and a controller 750.

The RF processor 710 converts a signal band and amplifies the signal to transmit and receive signals over a radio channel. Specifically, the RF processor 710 up-converts a baseband signal output from the modem 720 to an RF signal, transmits the RF signal via an antenna, and down-converts an RF signal received via the antenna to a baseband signal. For example, the RF processor 710 can include an amplifier, a mixer, an oscillator, a DAC, an ADC, and the like.

The modem 720 converts the baseband signal and the bit string according to the physical layer standard of the system. For example, according to the OFDM scheme, to transmit data, the modem 720 generates complex symbols by encoding and modulating the transmit bit string, maps the complex symbols to subcarriers, and constitutes OFDM symbols by applying the IFFT and inserting the CP. When receiving data, the modem 720 splits the baseband signal output from the RF processor 710 to OFDM symbols, restores the signals mapped to the subcarriers using the FFT, and restores the received bit string by demodulating and decoding the signals.

The storage 730 stores a basic program and data, such as transmit traffic and receive traffic, for the operations of the BS. The storage 730 provides the stored data according to a request of the controller 750. In particular, when the BS provides the multicast service, the storage 730 stores the corresponding multicast group information, such as, for example, the multicast CID, the multicast IP address, the group ID, and the scanning cycle information of the multicast service.

The backhaul communication part 740 provides an interface for the BS to communicate with the upper node. Specifically, the backhaul communication part 740 converts a bit string transmitted from the BS to the upper node to a physical signal, and converts a physical signal received from the upper node to a bit string.

The controller 750 controls the functions of the BS. For example, the controller 750 generates and provides a transmit traffic packet and a message to the modem 720, and analyzes a receive traffic packet and a message output from the modem 720. A unicast scheduler 752 of the controller 750 schedules the unicast service by, for example, allocating the resource for the unicast service. A multicast scheduler 754 of the controller 750 schedules the multicast service. Specifically, when receiving the multicast data from the multicast application server through the backhaul communication part 740, the multicast scheduler 754 allocates the resource for transmitting the multicast data. In so doing, the unicast scheduler 752 and the multicast scheduler 754 perform the scheduling based on the scanning cycle of the corresponding MS. Specifically, the unicast scheduler 752 and the multicast scheduler 754 exclude the MS from the scheduling in the scanning interval of the MS, and allocate the resource for transmitting and receiving data in the scheduling interval of the MS.

To provide the multicast service, the controller 750 performs the multicast path establishment procedure with, for example, the application server. The controller 750 receives the multicast group information through the multicast path establishment procedure and stores the information to the storage 730. The multicast group information includes the multicast IP address, the CID, and the group ID. The controller 750 receives the multicast data using the multicast group information and controls multicast of the data to the MSs. Particularly, to synchronize the scanning cycle of the multicast service, the controller 750 manages the scanning cycle pattern information and the scan offset information as described in detail below.

In an embodiment of the present invention, the controller 750 can prestore the scanning cycle pattern information in the production phase. Alternatively, the controller 750 provides the scanning cycle pattern information to the MSs through the broadcasting message. For example, the broadcasting message can be embodied as the DCD message. The controller 750 can provide the prestored scanning cycle pattern information, or the scanning cycle pattern information obtained from the operator management server. Alternatively, the controller 750 can obtain the scanning cycle pattern information together with the multicast group information from the application server through the multicast path establishment procedure.

In an embodiment of the present invention, the controller 750 can manage the scan offset information in the same manner as the scanning cycle pattern information. Specifically, the controller 750 can prestore the scan offset information, broadcast the scan offset information that is prestored or obtained from the operator management server, or receive the scan offset information from the application server through the multicast path establishment procedure. Alternatively, the controller 750 can determine the scan offset based on the multicast group information according to the predefined rule. For example, the controller 750 calculates the scan offset based on at least one of the CID, the IP address, and the ID. For example, the scan offset can be provided by CID % (modulo) n.

Figure 8:
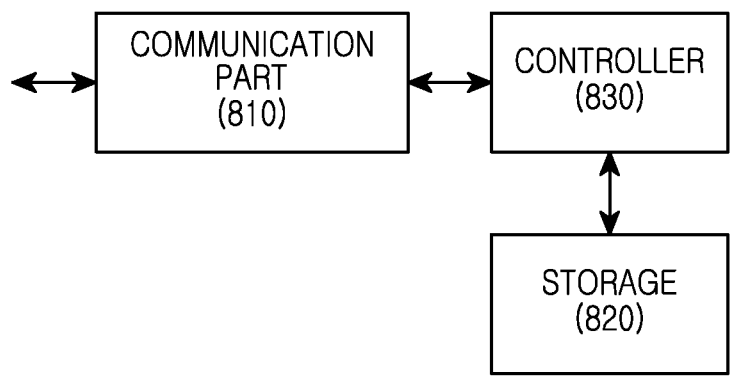
FIG. 8 is a diagram illustrating a PTT server in the broadband wireless access system, according to an embodiment of the present invention.

FIG. 8 is a block diagram illustrating the application server in the broadband wireless access system, according to an embodiment of the present invention.

In FIG. 8, the application server includes a communication part 810, a storage 820, and a controller 830.

The communication part 810 provides an interface for the application server to communicate with other nodes in the network. Specifically, the communication part 810 converts a bit string, which is transmitted from the application server to the other node, to a physical signal, and converts a physical signal received from the other node to a bit string.

The storage 820 stores a basic program and data, such as, configuration information for the operations of the application server. The storage 820 provides the stored data according to a request of the controller 830. In particular, when the application server is a PTT server, which provides the PTT group communication service using the multicasting of the wireless communication network, the storage 820 stores the PTT group information, such as, for example, the multicast CID, the multicast IP address, the group ID, and the scanning cycle information of the multicast service. The storage 820 stores information on client MSs of the PTT group.

The controller 830 controls the functions of the application server. For example, the controller 830 allocates the CID to the multicast group. The controller 830 establishes the multicast path with the BS and transmits the multicast group information to the client MSs of the multicast group. Through the multicast path establishment, the controller 830 transmits the multicast group information to the BS. The multicast group information includes the multicast CID, the multicast IP address, the group ID, and the scanning cycle information of the multicast service. The scanning cycle information includes at least one of the scanning cycle pattern information and the scan offset information.

As described in detail above, the scanning interval of the MS, which receives the multicast service, is synchronized between the BS and the MS, and the data is received only over the data reception interval in the broadband wireless access system. Therefore, the scanning quality degradation in the multicast service and the multicast service quality degradation in the scanning can be prevented.

While the present invention has been shown and described with reference to certain embodiments thereof, it will be understood by those skilled in the art that various changes in form and detail may be made therein without departing from the spirit and scope of the present invention as defined by the appended claims and their equivalents.

What is claimed is:

1. A method for operation of a mobile station (MS) in a wireless access system, the method comprising the steps of:
   receiving an application layer message, which is related to a session management, from an application server, wherein the application layer message includes information corresponding to a multicast group to which the MS belongs;
   determining a scanning cycle of the multicast service based on the information included in the application layer message, wherein the information comprises a scanning cycle pattern and a scan offset; and
   performing scanning and receiving multicast data for the multicast group to which the MS belongs according to the scanning cycle,
   wherein the scan offset is generated based on at least one of a connection identifier (CID) for the multicast group, an Internet protocol (IP) address for the multicast data, and an identifier (ID) of the multicast group, and
   wherein the scanning cycle pattern includes at least one of a scanning cycle total length, a scanning interval length, and a scheduling interval length.

2. The method of claim 1, wherein the scan offset is received from the application server.

3. The method of claim 1, further comprising:
   transmitting, to a Base Station (BS), a message requesting to match a scanning cycle of a unicast service with the scanning cycle of the multicast service.

4. The method of claim 3, wherein the message includes at least one of a desired scanning cycle length, a desired scanning interval length, a desired scheduling interval length, a desired scan offset, and a desired scanning interval start point.

5. A method of operation of a base station (BS) in a wireless access system, the method comprising the steps of:
   receiving multicast group information for a multicast group having one or more mobile stations (MSs), from an application server, wherein the multicast group information includes information corresponding to the multicast group;
   establishing a multicast path for the multicast group;
   determining a scanning cycle of the multicast service based on the information included in the multicast group information, wherein the information comprises a scanning cycle pattern and a scan offset; and
   multicasting data according to the scanning cycle,
   wherein the scan offset is generated based on at least one of a connection identifier (CID) for the multicast group, an Internet protocol (IP) address for the multicast data, and an identifier (ID) of the multicast group, and
   wherein the scanning cycle pattern includes at least one of a scanning cycle total length, a scanning interval length, and a scheduling interval length.

6. The method of claim 5, further comprising:
   broadcasting the scanning cycle pattern to the one or more MSs.

7. The method of claim 5, wherein the scan offset is received from the application server.

8. A method for operation of an application server for providing a multicast service through a wireless access system, the method comprising the steps of:
   allocating a connection identifier (CID) to a multicast group having one or more mobile stations (MSs); and
   transmitting an application layer message, which is related to a session management, to the one or more MSs, wherein the application layer message includes at least one of a scanning cycle pattern and a scan offset of a multicast service corresponding to the multicast group to which the one or more MSs belongs,
   wherein the scan offset is generated based on at least one of the CID for the multicast group, an Internet protocol (IP) address for the multicast data, and an identifier (ID) of the multicast group, and
   wherein the scanning cycle pattern includes at least one of a scanning cycle total length, a scanning interval length, and a scheduling interval length.

9. The method of claim 8, further comprising:
   transmitting a scan offset to the one or more MSs.

10. An apparatus of a mobile station (MS) in a wireless access system, the apparatus comprising:
    a modem for receiving an application layer message, which is related to a session management, from an application server, wherein the application layer message includes information of a multicast service corresponding to a multicast group to which the MS belongs; and
    a controller for determining a scanning cycle of the multicast service based on the information included in the application layer message, wherein the information comprises a scanning cycle pattern and a scan offset, and performing scanning and receiving multicast data for the multicast group to which the MS belongs according to the scanning cycle,
    wherein the scan offset is generated based on at least one of a connection identifier (CID) for the multicast group, an Internet protocol (IP) address for the multicast data, and an identifier (ID) of the multicast group, and
    wherein the scanning cycle pattern comprises at least one of:
    a scanning cycle total length;
    a scanning interval length; and
    a scheduling interval length.

11. The apparatus of claim 10, wherein the scan offset is received from the application server.

12. The apparatus of claim 10, wherein the controller controls to transmit, to a Base Station (BS), a message requesting to match a scanning cycle of a unicast service with the scanning cycle of the multicast service.

13. The apparatus of claim 12, wherein the message comprises at least one of:
   a desired scanning cycle length;
   a desired scanning interval length;
   a desired scheduling interval length;
   a desired scan offset; and
   a desired scanning interval start point.

14. An apparatus of a base station (BS) in a wireless access system, the apparatus comprising:
   a communication part for receiving multicast group information for a multicast group having one or more mobile stations (MSs), from an application server, wherein the multicast group information includes information of a multicast service corresponding to the multicast group;
   a controller for establishing a multicast path for the multicast group, determining a scanning cycle of the multicast service based on the information included in the multicast group information, wherein the information comprises a scanning cycle pattern and a scan offset; and
   a modem for multicasting data according to the scanning cycle,
   wherein the scan offset is generated based on at least one of a connection identifier (CID) for the multicast group, an Internet protocol (IP) address for the multicast data, and an identifier (ID) of the multicast group, and
   wherein the scanning cycle pattern comprises at least one of:
   a scanning cycle total length;
   a scanning interval length; and
   a scheduling interval length.

15. The apparatus of claim 14, wherein the controller controls broadcast of the scanning cycle pattern to the one or more MSs.

16. The apparatus of claim 14, wherein the scan offset is received from the application server.

17. An apparatus of an application server for providing a multicast service through a wireless access system, the apparatus comprising:
   a controller for allocating a connection identifier (CID) to a multicast group having one or more mobile stations (MSs); and
   a communication part for transmitting an application layer message, which is related to a session management, to the one more MSs, wherein the application layer message includes at least one of a scanning cycle pattern and a scan offset of a multicast service corresponding to the multicast group to which the one or more MSs belongs,
   wherein the scan offset is generated based on at least one of the CID for the multicast group, an Internet protocol (IP) address for the multicast data, and an identifier (ID) of the multicast group, and
   wherein the scanning cycle pattern comprises at least one of:
   a scanning cycle total length;
   a scanning interval length; and
   a scheduling interval length.

18. The apparatus of claim 17, wherein the controller controls transmission of a scan offset to the one or more MSs.

19. The method of claim 8, further comprising transmitting at least one of a group ID, a multicast Internet protocol (IP) address, and the CID.

20. The apparatus of claim 17, wherein the communication part transmits at least one of a group ID, a multicast Internet protocol (IP) address, and the CID.

* * * * *